United States Patent
Muramatsu et al.

(10) Patent No.: US 7,840,336 B2
(45) Date of Patent: Nov. 23, 2010

(54) CONTROL SYSTEM FOR GAS TURBINE AEROENGINE

(75) Inventors: Hironori Muramatsu, Wako (JP); Yuichi Hattori, Wako (JP); Makoto Tezuka, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 1231 days.

(21) Appl. No.: 11/431,560

(22) Filed: May 11, 2006

(65) Prior Publication Data

US 2007/0055435 A1   Mar. 8, 2007

(30) Foreign Application Priority Data

May 16, 2005   (JP)   ............................. 2005-143225

(51) Int. Cl.
*G06F 19/00* (2006.01)

(52) U.S. Cl. ................. 701/114; 701/100; 701/101; 701/102; 701/103; 701/104; 701/107; 123/319; 123/399; 123/403; 123/445; 123/472; 123/480; 123/488; 123/495

(58) Field of Classification Search ......... 701/100–104, 701/107, 114; 123/319, 399, 403, 445, 472, 123/480, 488, 495
See application file for complete search history.

(56) References Cited

U.S. PATENT DOCUMENTS

| | | | | |
|---|---|---|---|---|
| 4,032,757 A | | 6/1977 | Eccles | |
| 4,712,372 A | * | 12/1987 | Dickey et al. | 60/39.281 |
| 4,716,531 A | | 12/1987 | Saunders et al. | |
| 5,067,080 A | * | 11/1991 | Farman | 701/102 |
| 5,436,826 A | * | 7/1995 | O'Flarity | 700/79 |
| 6,353,790 B1 | * | 3/2002 | Tsuzuki | 701/100 |
| 6,393,355 B1 | * | 5/2002 | Muramatsu | 701/100 |
| 6,434,473 B1 | * | 8/2002 | Hattori | 701/100 |
| 6,922,625 B2 | * | 7/2005 | Weir et al. | 701/100 |

(Continued)

FOREIGN PATENT DOCUMENTS

GB   2412745   10/2005

(Continued)

OTHER PUBLICATIONS

Japanese Notification of Grounds for Rejection, Japanese Patent Application No. JP2005-143225, Date of Preparation: Jun. 10, 2010, Date of Mailing: Jul. 6, 2010, 3 pages, English Translation; 2 pages.

*Primary Examiner*—Khoi Tran
*Assistant Examiner*—Nikhil Sriraman
(74) *Attorney, Agent, or Firm*—Squire, Sanders & Dempsey, LLP

(57) ABSTRACT

In a gas turbine aeroengine control system, in Ch-A (first control channel), a first CPU monitors the operation of a second CPU and the second CPU monitors the operation of the first CPU; in Ch-B (second control channel), third and fourth CPUs similarly monitor each other, and when the operation of at least one of the first and second CPUs in Ch-A is found not to be normal, the output sent to an FCU (fuel control unit) is switched from the output of one or the other of the first and second CPUs of Ch-A to the output of one or the other of the third and fourth CPUs of Ch-B, thereby achieving improved CPU failure detection and realizing high redundancy and high reliability.

12 Claims, 5 Drawing Sheets

U.S. PATENT DOCUMENTS

| | | | |
|---|---|---|---|
| 7,237,382 B2 * | 7/2007 | Muramatsu et al. | 60/773 |
| 7,246,024 B2 * | 7/2007 | Muramatsu et al. | 702/116 |
| 7,246,495 B2 * | 7/2007 | Muramatsu et al. | 60/773 |
| 2005/0217273 A1 * | 10/2005 | Muramatsu et al. | 60/773 |
| 2005/0217274 A1 * | 10/2005 | Muramatsu et al. | 60/773 |
| 2005/0222822 A1 * | 10/2005 | Muramatsu et al. | 702/193 |

FOREIGN PATENT DOCUMENTS

| | | |
|---|---|---|
| GB | 2412752 | 10/2005 |
| GB | 2412753 | 10/2005 |
| GB | 2414570 | 11/2005 |
| JP | 5059612 | 5/1975 |
| JP | 57-062933 A | 4/1982 |
| JP | 62261617 A | 11/1987 |

* cited by examiner

CONTROL SYSTEM FOR GAS TURBINE AEROENGINE

BACKGROUND OF THE INVENTION

1. Field of the Invention

This invention relates to a control system for a gas turbine aeroengine.

2. Description of the Related Art

Safety is the top priority in a gas turbine aeroengine. Therefore, as taught by U.S. Pat. No. 4,716,531, for example, an aeroengine is equipped with dual control channels and each control channel is provided with a monitor system. If the active control channel should fail, the other control channel takes over. This system configuration is required by aviation laws and regulations. The assignee's U.S. Pat. No. 6,353,790 teaches a similar technology.

Such control channels today utilize an electronic control unit equipped with CPUs (central processing units). In view of the extremely high reliability required, two CPUs are necessary in the fuel control channel. Moreover, still higher reliability is required of the overspeed protector (OSP), so it is ordinarily provided as a separate unit. Owing to the need for redundancy regarding the fuel control channel CPUs, the aforesaid prior art system detects CPU failure by use of a WDT (watchdog timer) circuit and is therefore not adequate regarding failure detection accuracy.

In addition, the time limited dispatch (TLD) concept was recently introduced with regard to the aeroengines on regular flight schedules. TLD specifies that an engine may be operated and used for a certain period of time despite a failure condition in a redundant component. The prior art systems have a drawback in not being thoroughly TLD compatible.

SUMMARY OF THE INVENTION

An object of this invention is therefore to overcome the foregoing problems by providing a control system for a gas turbine aeroengine which enhances CPU failure detection accuracy and the like by providing each control channel with two CPUs that monitor each other, thereby making provision of an independent overspeed protector circuit unnecessary, and which is TLD compatible.

In order to achieve the object, this invention provides a system for controlling operation of a gas turbine aeroengine having a turbine, comprising: a speed sensor for producing an output indicative of a speed of the turbine; a throttle lever angle sensor for producing an output indicative of an angle of a throttle lever, operated by a pilot, that represents a pilot-desired output of the engine; a first control channel having at least a first CPU and a second CPU each inputting the outputs of the speed sensor and the throttle lever angle sensor, at least one of the first CPU and the second CPU acting as a first fuel supply command value calculator to calculate a fuel supply command value to be supplied to the engine such that the speed of the turbine becomes equal to a predetermined speed and to generate a first command output indicative of the fuel supply command value, the first CPU monitoring operation of the second CPU, while the second CPU monitoring operation of the first CPU; a second control channel having at least a third CPU and a fourth CPU each inputting the outputs of the speed sensor and the throttle lever angle sensor, at least one of the third CPU and the fourth CPU acting as a second fuel supply command value calculator to calculate the fuel supply command value to be supplied to the engine such that the speed of the turbine becomes equal to the predetermined speed and to generate a second command output indicative of the fuel supply command value, the third CPU monitoring operation of the fourth CPU, while the fourth CPU monitoring operation of the third CPU; a fuel control unit inputting at least the first command output of the first fuel supply command value calculator and supplying fuel to the engine based on the first command output of the first fuel supply command value calculator; and a switch for switching the output to be inputted in the fuel control unit from the first command output to the second command output, when at least one of the first CPU and the second CPU of the first control channel is monitored to be not operating normally.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A control system for a gas turbine aeroengine according to a preferred embodiment of the present invention will now be explained with reference to the attached drawings.

Figure 1:
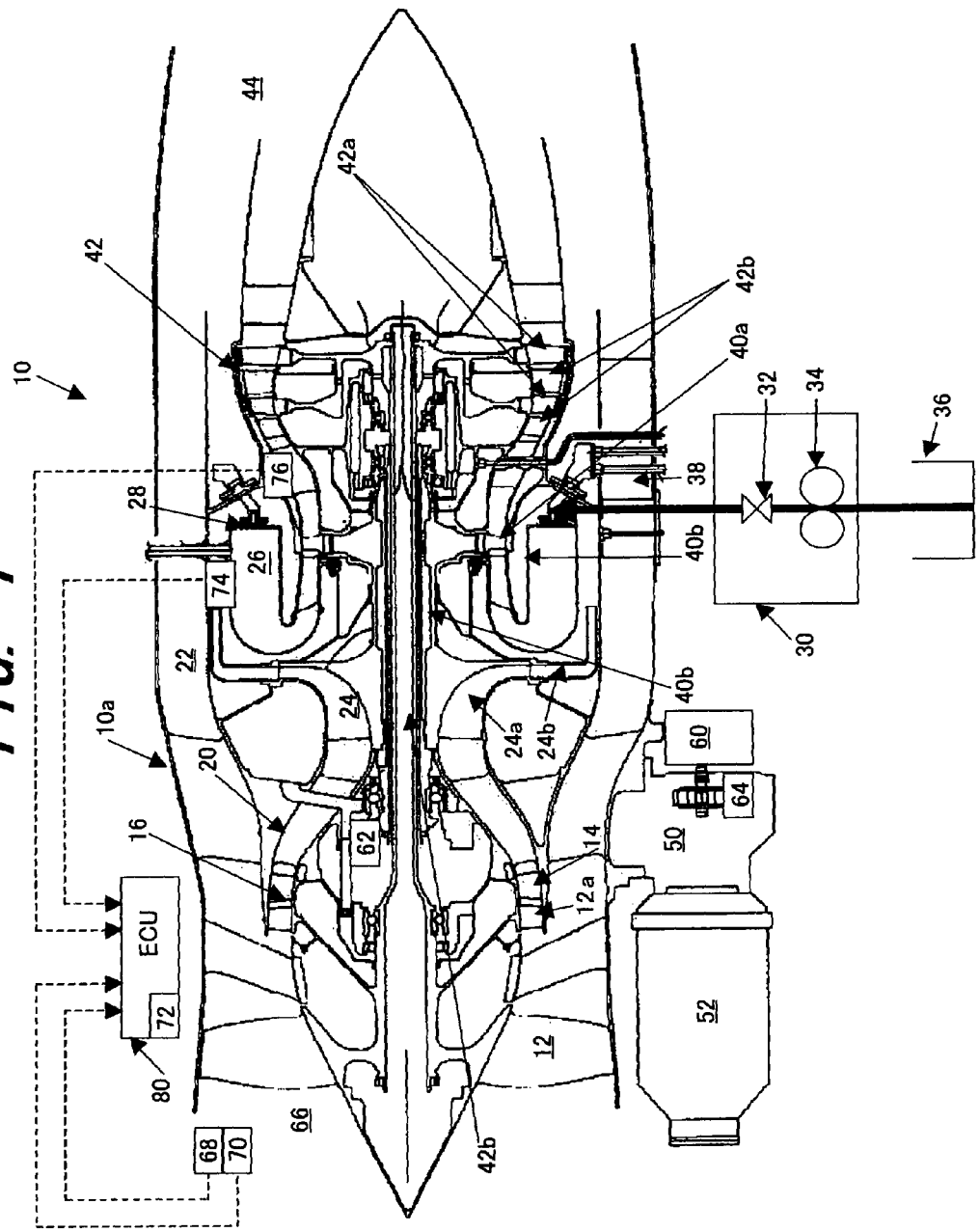
FIG. 1 is an overall schematic view of a control system for a gas turbine aeroengine according to an embodiment of this invention.

FIG. 1 is an overall schematic view of a control system for a gas turbine aeroengine according to an embodiment of this invention.

Four types of gas-turbine engines are commonly used in aircraft: the turbojet engine, turbofan engine, turboprop engine and turboshaft engine. A two-spool (shaft) turbofan engine will be taken as an example in the following explanation.

In FIG. 1, reference numeral 10 designates a turbofan engine (gas-turbine aeroengine; hereinafter referred to as "engine"). Reference numeral 10a designates its main engine unit. The engine 10 is mounted at an appropriate location of an airframe (not shown). The engine 10 is equipped with a fan rotor 12 that sucks in air while rotating rapidly. A low-pressure compressor rotor 12a is formed integrally with the fan rotor 12. The low-pressure compressor rotor 12a and a low-pressure compressor stator 14 facing it together form a low-pressure compressor 16 that compresses the sucked-in air and pumps it rearward.

A duct or bypass 22 is formed in the vicinity of the fan rotor 12 by a separator or splitter 20. Most of the air pulled in passes through the duct 22 to be jetted rearward of the engine without being burned at a later stage (in the core). The force of the air accelerated rearward by the fan produces a force of reaction that acts on the airframe (not shown), at which the engine 10 is mounted, as a propulsive force (thrust). Most of the propulsion is produced by the air flow from the fan.

The air compressed by the low-pressure compressor 16 flows rearward to a high-pressure compressor 24 where it is further compressed by a high-pressure compressor impeller 24a and a high-pressure compressor diffuser 24b and then flows rearward to a combustion chamber 26.

The combustion chamber 26 is equipped with fuel nozzles 28 that are supplied with pressurized fuel metered by an FCU (Fuel Control Unit) 30. The FCU 30 is equipped with a fuel metering valve 32. Fuel pumped by a fuel pump (gear pump) 34 from a fuel tank 36 located at an appropriate part of the airframe is metered by the fuel metering valve 32 and supplied to the fuel nozzles 28 through a fuel supply line 38.

The sprayed fuel is mixed with compressed air supplied from the high-pressure compressor 24 and the mixture is burned after being ignited at engine starting by an exciter (not shown in FIG. 1) and a spark plug (not shown). Once the air-fuel mixture begins to burn, the air-fuel mixture composed of compressed air and fuel is continuously supplied and burned.

The hot high-pressure gas produced by the combustion is sent to a high-pressure turbine 40 and rotates the high-pressure turbine rotor 40a at high speed. The high-pressure turbine rotor 40a is connected to the high-pressure compressor impeller 24a by a high-pressure turbine shaft 40b. The impeller 24a is therefore also rotated.

After driving the high-pressure turbine rotor 40a, the hot high-pressure gas is sent to a low-pressure turbine 42 to rotate the low-pressure turbine rotor 42a at relatively low speed. The low-pressure turbine rotor 42a is connected to the low-pressure compressor rotor 12a through a low-pressure turbine shaft 42b. The rotor 12a is therefore also rotated. The high-pressure turbine shaft 40b and the low-pressure turbine shaft 42b are provided in a dual coaxial structure.

The hot high-pressure gas passing through the low-pressure turbine 42, i.e., the turbine exhaust gas is mixed with the air stream passing through the duct 22 without compression or combustion and the combined flow is jetted rearward of the engine through a jet nozzle 44.

An accessory drive gearbox (hereinafter referred to as "gearbox") 50 is attached to the undersurface at the front end of the main engine unit 10a. An integrated starter/generator (hereinafter called "starter") 52 is attached to the front of the gearbox 50. The FCU 30 is located at the rear of the gearbox 50.

When the engine 10 is started, the rotation of the starter 52 is transmitted to the high-pressure turbine shaft 40b through a drive shaft and a gear mechanism including a bevel gear etc. (not shown) so as to pull in air needed for combustion.

The rotation of the starter 52 is also transmitted to a PMA (Permanent Magnet Alternator) 60 and the fuel pump 34. The fuel pump 34 is therefore driven to spray fuel from the fuel nozzles 28 as explained above. The resulting air-fuel mixture is ignited to start combustion.

When the engine 10 reaches self-sustaining operating speed, the rotation of the high-pressure turbine shaft 40b is transmitted back to the drive shaft and the gear mechanism including the bevel gear etc. (not shown) to drive the fuel pump 34 and also drive the PMA 60 and the starter 52. The PMA 60 therefore generates electricity and the starter 52 supplies power to the airframe.

At least two N1 sensors (speed sensors) 62 are installed near the low-pressure turbine shaft 42b of the engine 10 and generate outputs or signals proportional to the speed of the low-pressure turbine (rotational speed of the low-pressure turbine shaft 42b) N1. At least four N2 sensors (speed sensors) 64 are installed near the shaft of the PMA 60 and generate outputs or signals proportional to the speed of the high-pressure turbine (rotational speed of the high-pressure turbine shaft 40b) N2.

Further, at least one T1 sensor (temperature sensor) 68 and at least one P1 sensor (pressure sensor) 70 are installed near an air intake 66 at the front of the main engine unit 10a and generate outputs or signals proportional to the temperature T1 and the pressure P1, individually, of the inflowing air at that location. At least one P0 sensor (pressure sensor) 72 is installed inside an ECU (Electronic Control Unit) explained below and generates an output or signal proportional to atmospheric pressure P0.

Furthermore, at least two P3 sensors (pressure sensors) 74 are installed downstream of the impeller 24a and generate outputs or signals proportional to the output pressure P3 of the high-pressure compressor 24. At least two ITT sensors (temperature sensors) 76 are installed at appropriate locations between the high-pressure turbine 40 and the low-pressure turbine 42 and generate outputs or signals proportional to the temperature at these locations (engine-representative temperature) ITT (Inter-Turbine Temperature).

The aforementioned ECU (now designated by reference numeral 80) is installed at outer periphery of a fan case of the main engine unit 10a. The outputs of the sensors mentioned above are sent to the ECU 80.

Figure 2:
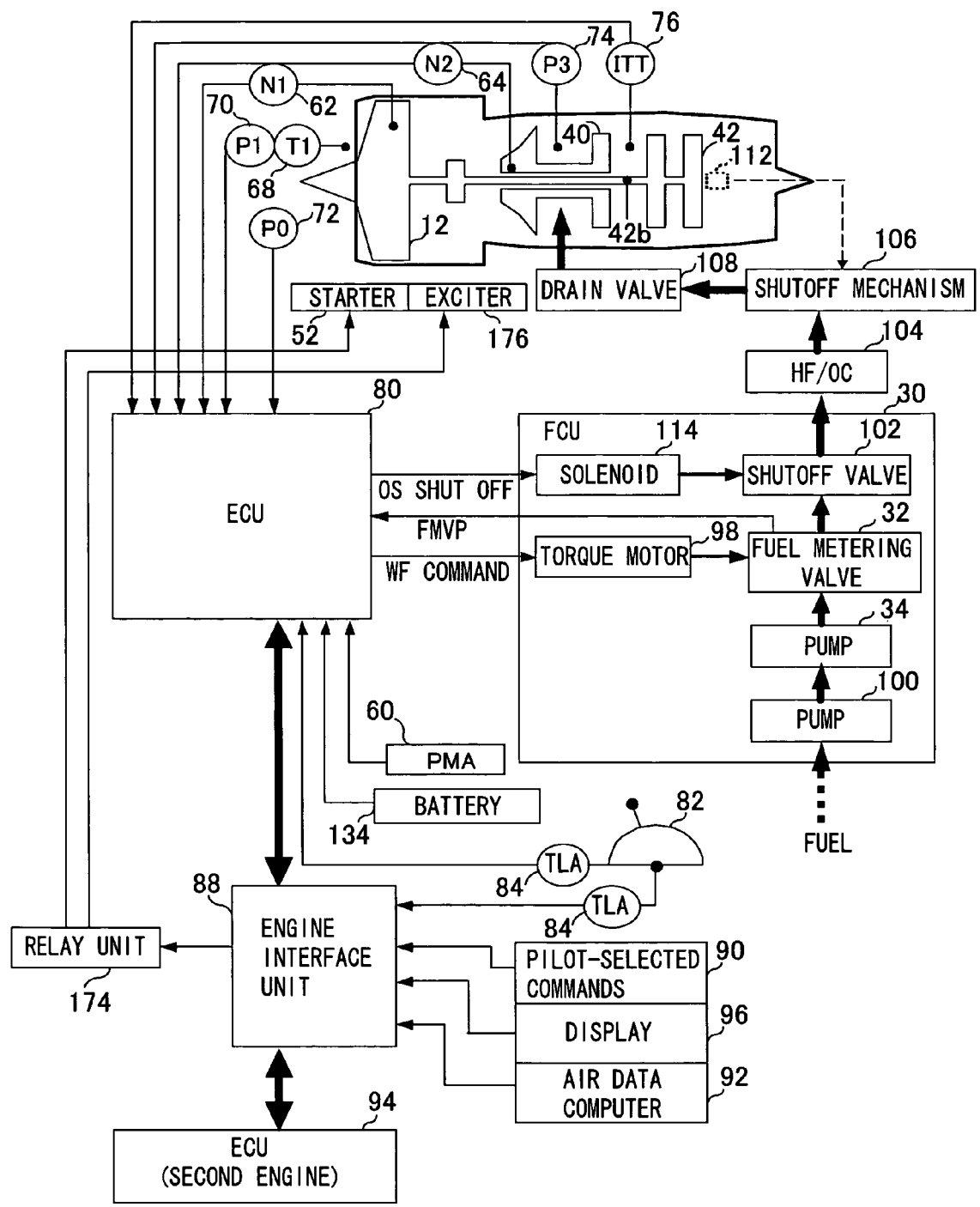
FIG. 2 is a block diagram showing the configuration of an ECU and an FCU shown in FIG. 1.

The ECU 80 and the FCU 30 are illustrated in the block diagram of FIG. 2, with the overall configuration of the FCU 30 being shown in detail.

In addition to the group of sensors set out above, at least two TLA (throttle lever angle) sensors 84 are installed near a throttle lever (thrust lever) 82 provided near the pilot's seat (cockpit; not shown) and generate outputs or signals proportional to the throttle lever angle or position (pilot-desired output) TLA set or inputted by the pilot (operator). The output of the TLA sensor 84 is also forwarded to the ECU 80. In FIG. 2, and also in FIGS. 3 and 4 discussed later, the sensors (P0 sensor, TLA sensor etc.) are indicated by the symbols for the parameters they detect (P0, TLA etc.).

Further, at least two FMVP (Fuel Metering Valve Position) sensors (not shown in FIG. 2) are installed at appropriate locations in the FCU 30 and generate outputs or signals proportional to the valve position FMVP of the fuel metering valve 32. The output of the FMVP sensor is also forwarded to the ECU 80.

The ECU 80 is also connected with an engine interface unit (communication interface unit; hereinafter referred to as "EIU") 88 through which it receives (or sends) pilot-selected commands 90 issued for devices other than the throttle lever 82, data from an on-board computer (Air Data Computer or ADC; a computer installed in the airframe on which the engine 10 is mounted) 92 and data from an ECU 94 of a second engine (not shown). The data in the ECU 80 are sent through the engine interface unit 88 to be displayed on a display 96 located in the cockpit.

Based on the inputted values, the ECU 80 calculates a command value (manipulated variable) of the flow rate of fuel to be supplied to the engine 10 as a current command value for a torque motor 98 in response to the throttle lever angle (pilot-desired output) TLA, such that the speed of the low-pressure turbine shaft (low-pressure turbine speed) N1 becomes a predetermined speed, and sends it to the FCU 30.

The FCU 30 is equipped with a low-pressure fuel pump 100 that pumps fuel from the fuel tank 36 (not shown in FIG. 2) and supplies it to the high-pressure fuel pump 34 through a filter (not shown). The high-pressure pump 34 raises the fuel to a high pressure and supplies it to the fuel metering valve 32. The fuel metering valve 32 is connected with the torque motor 98, which controls its spool position. The flow rate of the fuel pressurized by the fuel pump 34 is therefore regulated or metered by the fuel metering valve 32 in response to the spool position thereof. The metered fuel is supplied to the fuel nozzles 28 through a shutoff valve 102, HF/OC (Fuel Heater, Oil Cooler) 104, shutoff mechanism 106 and drain valve 108.

An emergency stop switch 112 is connected to the low-pressure turbine shaft 42b. If the low-pressure turbine shaft 42b should be displaced for some reason, the emergency stop switch 112 will turn on to operate the shutoff mechanism 106 and mechanically block supply of fuel to the fuel nozzles 28. In addition, a solenoid 114 is provided to operate the shutoff valve 102 in response to the throttle lever angle TLA and block supply of fuel to the fuel nozzles 28.

The ECU 80 also monitors whether the detected high-pressure turbine speed N2 exceeds a predetermined value (e.g., a value of 107 percent of the maximum speed). When the detected high-pressure turbine speed N2 exceeds a predetermined value, the ECU 80 determines that overspeed has occurred, sends the solenoid 114 a command to block supply of fuel to the engine 10 and operates the shutoff valve 102.

The control system for a gas turbine aeroengine according to this embodiment is characterized in the configuration of the ECU 80, whose configuration will be briefly explained with reference to FIG. 3.

As shown in the drawing, the ECU 80 of this embodiment is structurally characterized in comprising dual control channels (two control systems), namely a first control channel (designated Ch-A) and a second control channel (designated Ch-B). Control is conducted basically through Ch-A. When an abnormality arises in Ch-A, control is instead conducted through Ch-B.

Ch-A is provided with two CPUs, a first CPU 116 and a second CPU 118. The first CPU 116 calculates a control input (fuel supply command value; more exactly, torque motor current command value). Each of the first CPU 116 and second CPU 118 monitors the other and discriminates whether or not it is operating normally. In other words, the first CPU 116 monitors the operation of the second CPU 118 and the second CPU 118 monitors the operation of the first CPU 116.

When both the first CPU 116 and the second CPU 118 are found to be operating normally, a driver 122a (designated "OUT" in FIG. 3) forwards the output of the first CPU 116 to the FCU 30 through a switch (circuit) 120.

Ch-B is also provided with two CPUs, a third CPU 126 and a fourth CPU 128. The third CPU 126 operates in parallel with the first CPU 116 to calculate a control input (fuel supply command value; more exactly, torque motor current command value). Each of the third CPU 126 and fourth CPU 128 monitors the other and discriminates whether or not it is operating normally. In other words, the third CPU 126 monitors the operation of the fourth CPU 128 and the fourth CPU 128 monitors the operation of the third CPU 126.

When it is found in Ch-A that one or the other of the first CPU 116 and the second CPU 118 is not operating normally, the output of the third CPU 126 is sent through a second driver (designated "OUT") 122b and a switch (circuit) 130 and is forwarded to the FCU 30 by the switch 120.

When in this condition it is further found that one or the other of the third CPU 126 and the fourth CPU 128 is not operating normally, the switch 130 operates to turn off (open) the switch 120, so that the FCU 30 receives no input, thereby controlling the fuel flow rate (indicative of the fuel supply command value) to a predetermined value, namely to zero or a minimum value, i.e., controlling it to the safe side.

More specifically, when in Ch-A the first CPU 116 finds the second CPU 118 to be operating normally, it outputs a normal signal (L level), and when the second CPU 118 finds the first CPU 116 to be operating normally, it outputs a normal signal (L level). The output signals are sent to an OR circuit 132a. When the signals received by the OR circuit 132a are both normal, the OR circuit 132a outputs a normal signal (L level). The output of the OR circuit 132a is sent to the switch 120. So long as the switch 120 continues to receive a normal signal from the OR circuit 132a, it continues to send the output of the first CPU 116, i.e., the output indicating the fuel supply command value through the driver 122a to the FCU 30.

When the first CPU 116 finds the second CPU 118 is not operating normally, it outputs a fail signal (H level), and when the second CPU 118 finds the first CPU 116 not to be operating normally, it outputs a fail signal (H level). When at least one of the signals received by the OR circuit 132a is a fail signal, the OR circuit 132a outputs a fail signal (H level). When the output of the OR circuit 132a changes to a fail signal, the switch 120 performs output switching to send the Ch-B output (output indicating the fuel supply command value) through the driver 122b and switch 130 to the FCU 30.

Similarly, when in Ch-B the third CPU 126 finds the fourth CPU 128 to be operating normally, it outputs a normal signal (L level), and when the fourth CPU 128 finds the third CPU 126 to be operating normally, it outputs a normal signal (L level). The output signals are sent to an OR circuit 132b. When the signals received by the OR circuit 132b are both normal, the OR circuit 132b outputs a normal signal (L level).

The output of the OR circuit 132b is sent to the switch 130. So long as the switch 130 continues to receive a normal signal from the OR circuit 132b, it continues to send the output of the third CPU 126 through the driver 122b to the switch 120. Therefore, when the output of the OR circuit 132a changes to a fail signal, the switch 120 performs output switching to send the output of the third CPU 126 of Ch-B (output indicating fuel supply command value) through the driver 122b and switch 130 to the FCU 30.

When in this condition the third CPU 126 finds the fourth CPU 128 not to be operating normally, it outputs a fail signal (H level), and when the fourth CPU 128 finds the third CPU 126 not to be operating normally, it outputs a fail signal (H level). When one or the other of the signals received by the OR circuit 132b is a fail signal, the OR circuit 132b outputs a fail signal (H level). When the output of the OR circuit 132b changes to a fail signal, the switch 130 outputs a predetermined value, namely zero or a minimum value.

In other words, when in Ch-A the first CPU 116 (or second CPU 118) is found not to be operating normally, the output sent to the FCU 30 is switched to the output of the third CPU 126 but when in this condition it is found in Ch-B that the third CPU 126 (or fourth CPU 128) is not operating normally, the switch 120 is turned off (opens), so that the FCU 30 receives no input, thereby controlling the fuel flow rate indicative of the fuel supply command value to a predetermined value, namely to zero or a minimum value, i.e., controlling it to the safe side.

In the foregoing configuration, each of the first CPU 116 and second CPU 118 monitors the operation of the other by counting the number of pulses regularly outputted by the other and determining that it is operating normally if the count value matches a predetermined value. However, the invention is not limited to this method and any of various other mutual monitoring methods can be appropriately utilized instead. For example, in the case of a configuration in which the second CPU 118 and fourth CPU 128 also calculate the control input in parallel with the first CPU 116 and third CPU 126, it is possible to enable each CPU to discriminate whether its mate is operating normally by receiving the value (output) calculated by its mate and comparing it with its own calculated value.

It should be noted that the provision of the switch 130 at the illustrated position ensures that faulty operation of Ch-B has no effect on Ch-A.

Figure 4:
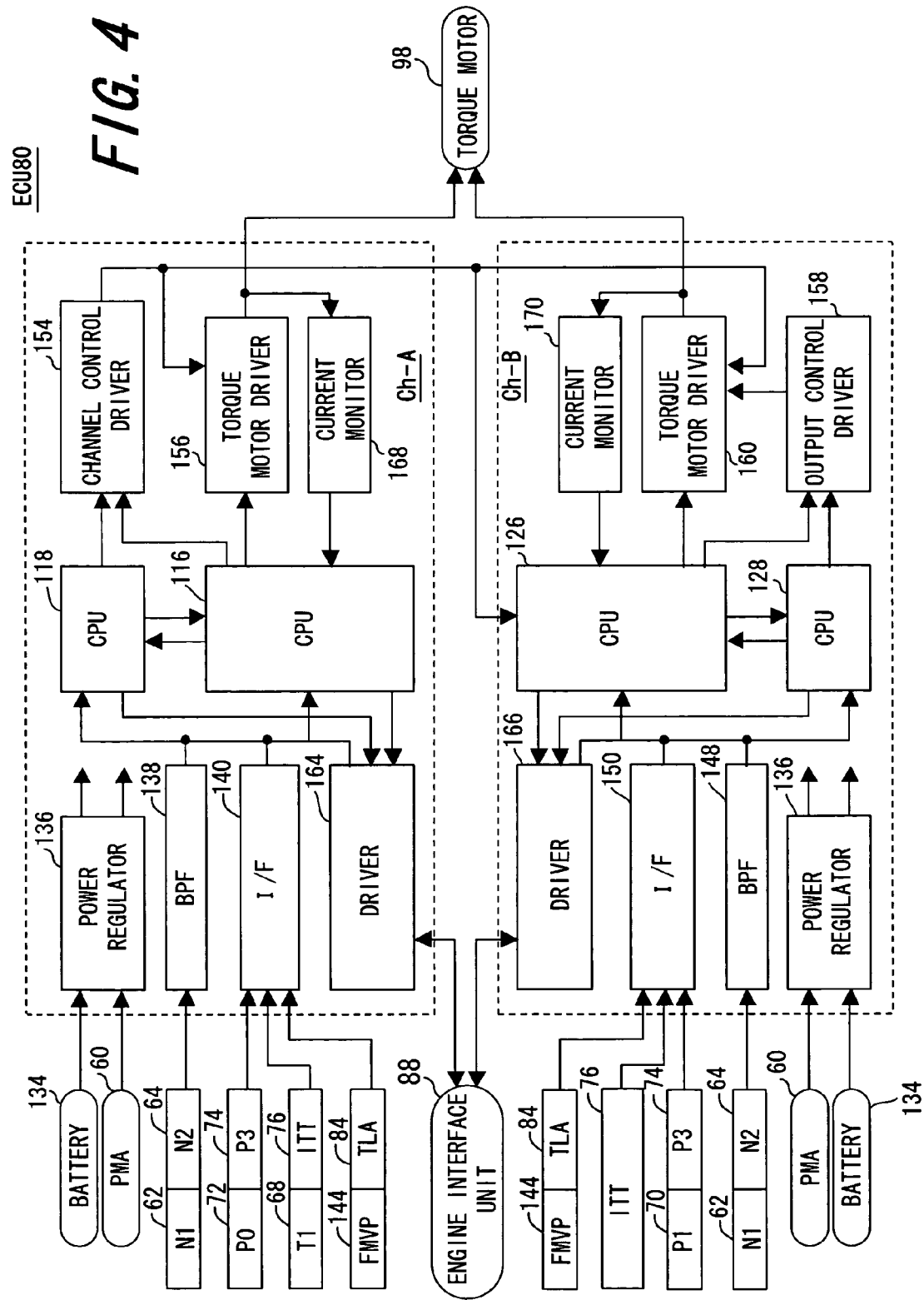
FIG. 4 is a block diagram more specifically showing the configuration of the ECU shown in FIG. 3.

With the foregoing in mind, the configuration of the ECU 80 will now be explained with respect to FIG. 4.

In the ECU 80, Ch-A and Ch-B are connected to the PMA 60 and onboard battery 134 and are supplied with operating power by the one thereof selected by a selection circuit as being of higher voltage. A power regulator 136 regulates the inputted voltage to the operating voltage of the ECU and the operating voltage of a driver (explained later).

The outputs of the dual-system N1 sensor 62 and N2 sensor 64 for detecting the low-pressure turbine speed N1 and the high-pressure turbine speed N2 are inputted to Ch-A of the ECU 80, passed through a BPF (band-pass filter) 138, and stored in a RAM (random access memory; not shown).

The outputs of the single-system P0 sensor 72 and dual-system P3 sensor 74 for detecting the pressures P0 and P3 at different engine locations and the outputs of the single-system T1 sensor 68 for detecting the temperature T1 and the dual-system ITT sensor 76 for detecting the temperature ITT are stored in the RAM through an I/F (interface) 140. The output of the FMVP sensor 144 for detecting the position FMVP of the fuel metering valve 32 and the output of the TLA sensor 84 for detecting the throttle lever position TLA are also stored in the RAM through the I/F 140.

As termed in this specification, a "single-system" sensor comprises at least one unit whose output is sent to only one or the other of Ch-A and Ch-B and a "dual-system" sensor comprises at least two units whose outputs are sent to both Ch-A and Ch-B.

The first CPU 116 of Ch-A processes the inputted values in accordance with instructions stored in a ROM (read-only memory; not shown). By this, as mentioned above, it calculates a command value (control input) for supplying fuel to the engine 10 at the flow rate needed to bring the low-pressure turbine speed N1 to the speed corresponding to the throttle lever position (pilot-desired output) TLA, namely, a command value indicating the amount of current to be passed through the torque motor 98.

Further, the outputs of the dual-system N1 sensor 62 and N2 sensor 64 for detecting the low-pressure turbine speed N1 and the high-pressure turbine speed N2 are inputted to Ch-B of the ECU 80, passed through a BPF (band-pass filter) 148, and stored in a RAM (not shown).

The outputs of the single-system P1 sensor 70 and dual-system P3 sensor 74 for detecting the pressures P1 and P3 at different engine locations and the outputs of the dual-system ITT sensor 76 for detecting the temperature ITT are stored in the RAM through an I/F (interface) 150. The output of the FMVP sensor 144 for detecting the position FMVP of the fuel metering valve 32 and the output of the TLA sensor 84 for detecting the throttle lever position TLA are also stored in the RAM through the I/F 150.

The third CPU 126 of Ch-B processes the input values in accordance with instructions stored in a ROM (not shown). By this, as mentioned above, it calculates a – command value (control input) for supplying fuel to the engine 10 at the flow rate needed to bring the low-pressure turbine speed N1 to the speed corresponding to the throttle lever position (pilot-desired output) TLA, namely, a command value indicating the amount of current to be passed through the torque motor 98.

The EIU 88 is connected to the ECU 80 through drivers (communication drivers) 164, 166.

Any single-system sensor signal received by Ch-A or Ch-B is sent to the other channel by inter-CPU communication. That is to say, both channels (Ch-A and Ch-B) are imparted with the same control accuracy by enabling them to import all signals required for control from the sensors by either hard wiring or inter-channel communication.

Among the operating parameters of the engine 10 other than the turbine speeds N1, N2 and the pilot-desired output (throttle lever position TLA), the outputs of the sensors that are to detect parameters indicating atmospheric conditions that are also forwarded from the computer installed in the airframe on which the engine 10 is mounted (on-board computer 92), i.e., the sensor outputs that indicate the atmospheric pressure P0, intake air pressure (inlet pressure) P1 and intake air temperature (fan temperature) T1, are made single-system outputs that are sent to either Ch-A or Ch-B and thereafter sent to the other channel through the EIU 88 by inter-CPU communication. Thus there is some difference between the parameters inputted to Ch-A and Ch-B. This is indicated in FIG. 3 by use of the designations "First sensor group" and "Second sensor group."

Figure 3:
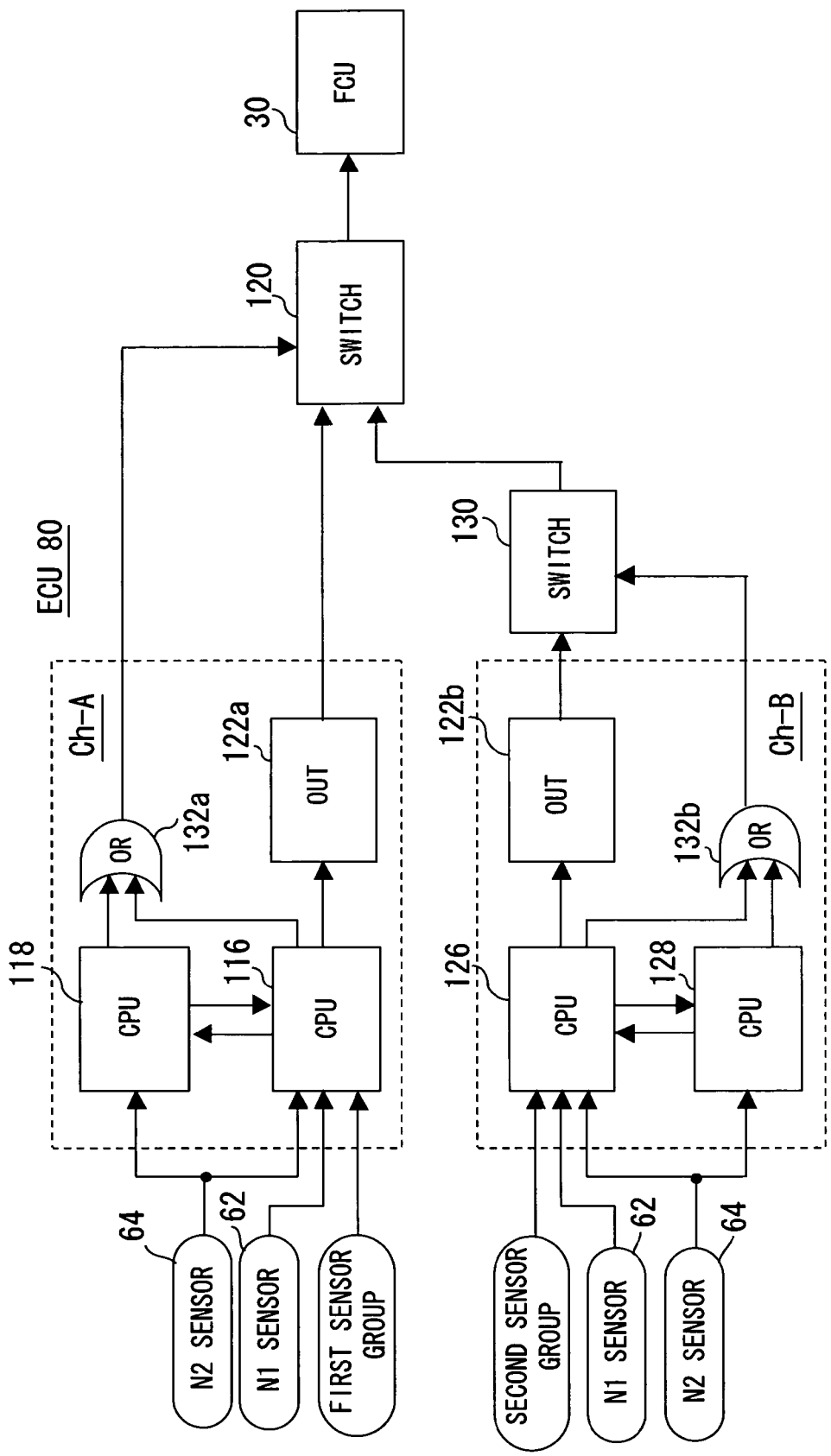
FIG. 3 is a block diagram schematically showing the characteristics of the configuration of the ECU shown in FIGS. 1 and 2.

As is explained with regard to FIG. 3, the first CPU 116 and second CPU 118 in Ch-A each checks whether the other is operating normally.

This will be explained. As shown in FIG. 4, the first CPU 116 and second CPU 118 are connected to a channel control driver (switch) 154 that functions like the switch 120 shown in FIG. 3. When either of the CPUs (second CPU 118 or first CPU 116) finds the other to be operating normally, it outputs a normal signal and does not output a fail signal. And so long as it continues to find the other CPU to be operating normally, it continues to output a normal signal (L level) to the OR circuit 132a shown in FIG. 3 (omitted in FIG. 4) and does not output a fail signal (H level) thereto.

As a result, the channel control driver 154 outputs the calculation result (output) of the first CPU 116 through a torque motor driver 156 to operate the torque motor 98 of the FCU 30.

When either the first CPU 116 or second CPU 118 finds the other not to be operating normally, it outputs a fail signal to the channel control driver 154 (the OR circuit 132a outputs a fail signal). When the channel control driver 154 receives a fail signal indicating one or the other of the first CPU 116 and second CPU 118 not to be operating normally (when the OR circuit 132a outputs a fail signal), the output of the torque motor driver 156 is terminated and a signal is sent to the third CPU 126 and a torque motor driver 160 of Ch-B so as to send the calculation result (output) of the CPU 126 through the torque motor driver 160 to operate the torque motor 98 of the FCU 30.

The third CPU 126 and fourth CPU 128 in Ch-B each checks whether the other is operating normally.

The third CPU 126 and fourth CPU 128 are connected to an output control driver 158 that functions like the switch 130 shown in FIG. 3. When either of the CPUs (fourth CPU 128 or third CPU 126) finds the other to be operating normally, it does not output a fail signal. And so long as it continues to find the other CPU to be operating normally, it continues to output a normal signal to the OR circuit 132b shown in FIG. 3 (omitted in FIG. 4) and does not output a fail signal (H level) thereto.

Thus when Ch-B takes over from first control channel Ch-A, the output control driver 158 sends the calculation result (output) of the third CPU 126 through the torque motor driver 160 to operate the torque motor 98 of the FCU 30.

When either the third CPU 126 or fourth CPU 128 finds the other not to be operating normally, it sends a fail signal to the output control driver 158 (the OR circuit 132b outputs a fail signal). When the output control driver 158 receives a fail signal from the third CPU 126 or fourth CPU 128 (when the OR circuit 132b outputs a fail signal), the output of the torque motor driver 160 is terminated.

So after the first CPU 116 (or second CPU 118) in Ch-A is found not to be operating normally and the output sent to the FCU 30 has been switched to the output of the third CPU 126 of Ch-B, if the third CPU 126 (or fourth CPU 128) of Ch-B is found not to be operating normally, the output control driver 158 sends an output to the channel control driver 154 to terminate its operation (as viewed in FIG. 3, to open the switch 120, so that the FCU 30 receives no input, thereby controlling the fuel flow rate to the predetermined value, namely to zero or a minimum value, i.e., controlling it to the safe side).

When either the first CPU 116 or second CPU 118 in Ch-A finds the other not to be operating normally, it outputs a fail signal to the channel control driver 154 and outputs a fail signal to the driver 164. Similarly, when the third CPU 126 or fourth CPU 128 of Ch-B finds the other not to be operating normally, it outputs a fail signal to the output control driver 158 and outputs a fail signal to the driver 166.

The drivers 164, 166 latch the received fail signal(s), use the fail signal(s) to identify which of the first to fourth CPUs is (are) not operating normally, and output an identification signal through the EIU 88 to the on-board computer 92 and the ECU 94 of the second engine.

The remainder of the ECU 80 configuration shown in FIG. 4 will be explained. The current command value sent to the torque motor 98 is detected by current monitors 168, 170, thereby monitoring the operation of the torque motor 98.

When the first CPU 116 of Ch-A finds that a failure condition has occurred in the torque motor 98, it terminates output to the torque motor driver 156 and sends a signal through the channel control driver 154 to the CPU 126 of Ch-B to use the torque motor 98 connected to Ch-B as a substitute. When the third CPU 126 of Ch-B finds that a failure condition has occurred in the torque motor 98, it terminates output to the output control driver 158.

Further, as shown in FIG. 2, the EIU 88 receives the outputs of the TLA sensor 84 and the like and controls the operation of the starter 52 and an exciter 176 through a relay unit 174 in accordance with commands from the cockpit.

The detailed configuration of the overspeed protector (OSP) will be explained.

Figure 5:
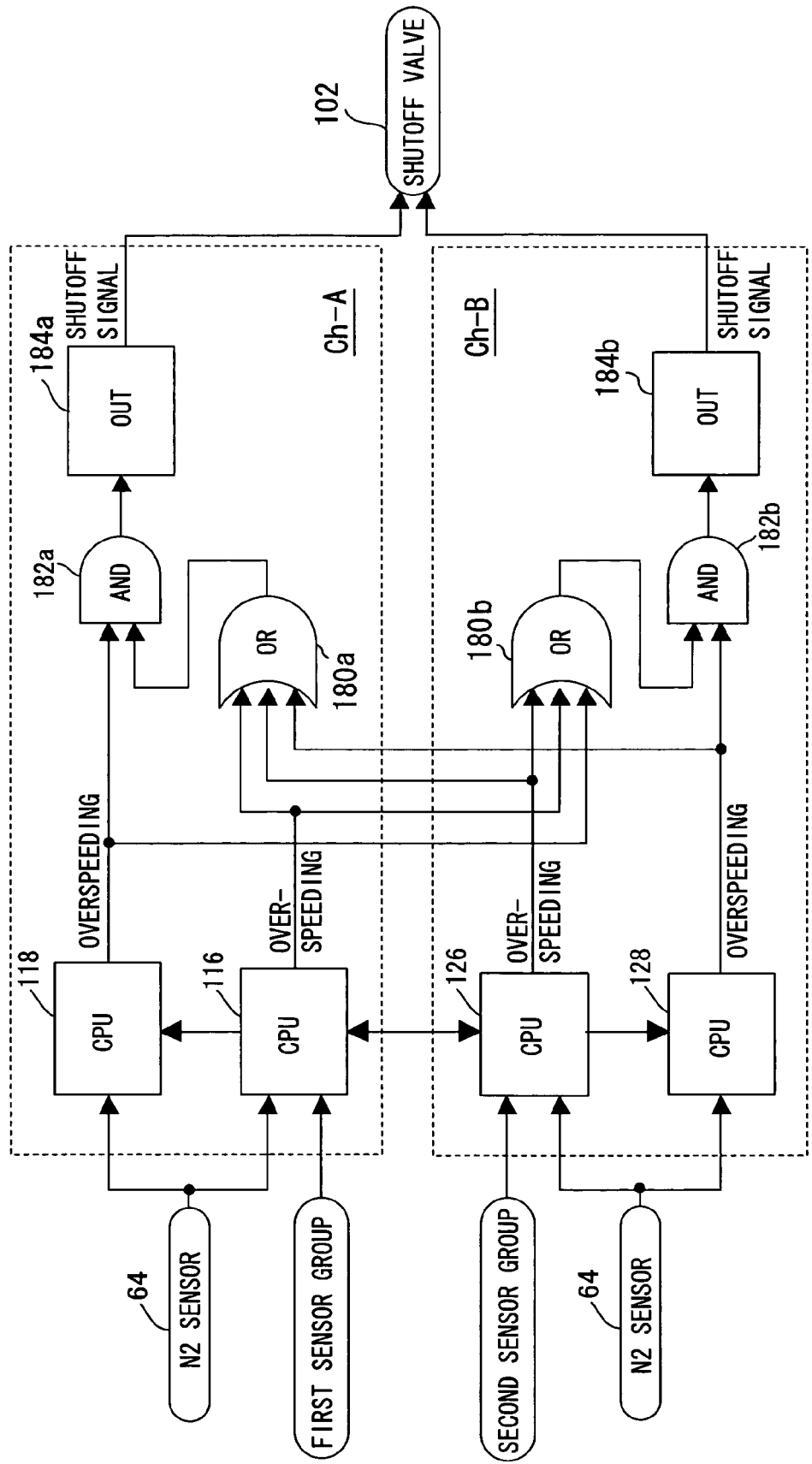
FIG. 5 is a block diagram schematically showing the characteristics of the configuration of an overspeed protector in the ECU shown in FIG. 3.

As shown schematically in FIG. 5, in this embodiment the first CPU 116, second CPU 118, third CPU 126 and fourth CPU 128 independently monitor the high-pressure turbine speed N2 and discriminate overspeed. The final determination regarding whether overspeed has occurred is made by comparing the findings of the four CPUs.

The first CPU 116 and second CPU 118 in Ch-A monitor whether the detected high-pressure turbine speed N2 exceeds a predetermined speed (e.g., a value defined as corresponding to, say, 107% of the maximum speed). When they find that the detected high-pressure turbine speed N2 exceeds the predetermined speed, they determine that the engine is overspeeding and output overspeed signals (H level).

Similarly, the third CPU 126 and fourth CPU 128 in Ch-B also monitor whether the detected high-pressure turbine speed N2 exceeds the predetermined speed. When they find that the detected high-pressure turbine speed N2 exceeds the predetermined speed, they determine that overspeeding has occurred and output overspeed signals (H level). The four overspeed signals are then compared to make the final determination regarding whether the engine is overspeeding. When the result is affirmative, a shutoff signal is output.

In this embodiment, the criteria for determining that the engine 10 is overspeeding are defined as:

(1) Two or more of the four CPUs make overspeed determinations, and (2) At least one of the second CPU 118 and fourth CPU 128 makes an overspeed determination.

In view of these criteria, Ch-A is provided with an OR circuit 180a and an AND circuit 182a, and Ch-B is provided with an OR circuit 180b and an AND circuit 182b. When the first CPU 116 of Ch-A determines overspeeding, it outputs an overspeed signal (H level) and sends it to the OR circuit 180a of Ch-A and the OR circuit 180b of Ch-B. When the second CPU 118 determines overspeeding, it outputs an overspeed signal (H level) and sends it to one input terminal of the AND circuit 182a of Ch-A and the OR circuit 180b of Ch-B.

Similarly, when the third CPU 126 of Ch-B determines overspeeding, it outputs an overspeed signal (H level) and sends it to the OR circuit 180b of Ch-B and the OR circuit 180a of Ch-A. When the fourth CPU 128 determines overspeeding, it outputs an overspeed signal (H level) and sends it to one input terminal of the AND circuit 182b of Ch-B and the OR circuit 180a of Ch-A.

In Ch-A, the output of the OR circuit 180a is sent to the other input terminal of the AND circuit 182a. In Ch-B the output of the OR circuit 180b is sent to the other input terminal of the AND circuit 182b. The output of the AND circuit 182a of Ch-A is sent to an output circuit 184a, and the output of the AND circuit 182b of Ch-B is sent to an output circuit 184b.

In Ch-A, when at least one among the first CPU 116, third CPU 126 and fourth CPU 128 is outputting an overspeed signal, the OR circuit 180a outputs an overspeed signal (H level) and sends it to the AND circuit 182a. In this condition, if the second CPU 118 outputs an overspeed signal, the AND circuit 182a outputs an overspeed signal. This output is sent to the output circuit 184a, which responds by operating the shutoff valve 102. Ch-B operates similarly. In the described arrangement, the OR circuits 180, AND circuits 182 and output circuits 184 constitute a discrimination circuit.

It therefore follows that the output circuit 184a (or 184b) outputs a shutoff signal when two or more of the four CPUs make overspeed determinations and at least one of the second CPU 118 and fourth CPU 128 makes an overspeed determination (outputs an overspeed signal).

As explained in the forgoing, the control system for a gas turbine aeroengine according to this embodiment is configured so that, in Ch-A (first control channel), the first CPU 116 monitors the operation of the second CPU 118 and the second CPU 118 monitors the operation of the first CPU 116; in Ch-B (second control channel), the third and fourth CPUs 126, 128 similarly monitor each other; and when the operation of at least one of the first and second CPUs 116, 118 in Ch-A (first control channel) is found not to be normal, the output sent to the FCU 30 is switched from the output of one or the other of the first and second CPUs 116, 118 of Ch-A (first control channel) to the output of one or the other of the third and fourth CPUs 126, 128 of Ch-B (second control channel). This embodiment can therefore achieve improved CPU failure detection and realize high redundancy and high reliability.

Further, the control system for a gas turbine aeroengine according to this embodiment is configured so that the four CPUs all receive the output of the N2 sensor 64 and independently discriminate overspeeding. This makes provision of an independent overspeed protector unnecessary. In addition, the provision of four CPUs, two per channel, makes the system compatible with TLD.

Furthermore, the control system for a gas turbine aeroengine according to this embodiment is configured so as to discriminate whether the turbine speed detected by the four CPUs, more specifically the high-pressure turbine speed N2, exceeds a predetermined speed, output an overspeed signal when the high-pressure turbine speed N2 exceeds the predetermined speed, and so as to comprise the discrimination circuit (OR circuits 180, AND circuits 182 and output circuits 184) for receiving the overspeed signals and determining that the gas turbine engine 10 is overspeeding when at least two of the first to fourth CPUs output overspeed signals. The system of this embodiment therefore not only provides the foregoing advantages but enhances overspeed detection accuracy by discriminating that the engine is overspeeding when at least two of the first to fourth CPUs 116, 118, 126 and 128 output overspeed signals.

Moreover, the control system for a gas turbine aeroengine according to this embodiment is configured so that among the operating parameters of the engine 10 other than the turbine speeds N1, N2 and the pilot-desired output (throttle lever position TLA), the outputs of the sensors that are to detect parameters indicating atmospheric conditions that are also forwarded from the on-board computer 92, i.e., the sensor outputs that indicate the atmospheric pressure P0, intake air pressure (inlet pressure) P1 and intake air temperature (fan temperature) T1, are made single-system outputs that are sent to only one or the other of Ch-A and Ch-B. The complexity of the sensor configuration is therefore optimally minimized to prevent excessive redundancy of signal inputs while still achieving the desired control.

The embodiment is thus configured to have a system for controlling operation of a gas turbine aeroengine (10) having a turbine (low-pressure turbine 42, high-pressure turbine 40), comprising: a speed sensor (N1 sensor 62, N2 sensor 64) for producing an output indicative of a speed of the turbine (N1, N2); a throttle lever angle sensor (TLA sensor 84) for producing an output indicative of an angle of a throttle lever (82), operated by a pilot, that represents a pilot-desired output of the engine; a first control channel (Ch-A) having at least a first CPU (116) and a second CPU (118) each inputting the outputs of the speed sensor and the throttle lever angle sensor, at least one of the first CPU and the second CPU acting as a first fuel supply command value calculator to calculate a fuel supply command value to be supplied to the engine such that the speed of the turbine (N1) becomes equal to a predetermined speed and to generate a first command output indicative of the fuel supply command value, the first CPU monitoring operation of the second CPU, while the second CPU monitoring operation of the first CPU; a second control channel (Ch-B) having at least a third CPU (126) and a fourth CPU (128) each inputting the outputs of the speed sensor and the throttle lever angle sensor, at least one of the third CPU and the fourth CPU acting as a second fuel supply command value calculator to calculate the fuel supply command value to be supplied to the engine such that the speed of the turbine (N1) becomes equal to the predetermined speed and to generate a second command output indicative of the fuel supply command value, the third CPU monitoring operation of the fourth CPU, while the fourth CPU monitoring operation of the third CPU; a fuel control unit (FCU 30) inputting at least the first command output of the first fuel supply command value calculator and supplying fuel to the engine based on the first command output of the first fuel supply command value calculator; and a switch (switch 120, channel control unit 154) for switching the output to be inputted in the fuel control unit from the first command output to the second command output, when at least one of the first CPU (116) and the second CPU (118) of the first control channel (Ch-A) is monitored to be not operating normally.

In the system, the first to the fourth CPUs (116, 118, 126, 128) monitor whether the detected speed of the turbine (more precisely, high-pressure turbine speed N2) exceeds the predetermined speed and generate an overspeed signal when the detected speed of the turbine exceeds the predetermined speed.

More specifically, the embodiment is thus configured to have a system for controlling operation of a gas turbine aeroengine (10) having a low-pressure turbine (42) and a high-pressure turbine (40), comprising: a speed sensor (N1 sensor 62) for producing an output indicative of a speed of the low-pressure turbine (N1); a throttle lever angle sensor (84) for producing an output indicative of an angle of a throttle lever (82), operated by a pilot, that represents a pilot-desired output of the engine; a first control channel (Ch-A) having at least a first CPU (116) and a second CPU (118) each inputting the outputs of the speed sensor and the throttle lever angle sensor, at least one of the first CPU and the second CPU acting as a first fuel supply command value calculator to calculate a fuel supply command value to be supplied to the engine such that the speed of the low-pressure turbine (42) becomes equal to a predetermined speed and to generate a first command output indicative of the fuel supply command value, the first CPU monitoring operation of the second CPU, while the second CPU monitoring operation of the first CPU; a second control channel (Ch-B) having at least a third CPU (126) and a fourth CPU (128) each inputting the outputs of the speed sensor and the throttle lever angle sensor, at least one of the third CPU and the fourth CPU acting as a second fuel supply command value calculator to calculate the fuel supply command value to be supplied to the engine such that the speed of the low-pressure turbine becomes equal to the predetermined speed and to generate a second command output indicative of the fuel supply command value, the third CPU monitoring operation of the fourth CPU, while the fourth CPU monitoring operation of the third CPU; a fuel control unit (30) inputting at least the first command output of the first fuel supply command value calculator and supplying fuel to the engine based on the first command output of the first fuel supply command value calculator; and a switch (120, 154) for switching the output to be inputted in the fuel control unit from the first command output to the second command output, when at least one of the first CPU and the second CPU of the first control channel is monitored to be not operating normally.

The system further includes: a second speed sensor (N2 sensor 64) for producing an output indicative of a speed of the high-pressure turbine (N2); and the first to the fourth CPUs (116, 118, 126, 128) monitor whether the detected speed of the high-pressure turbine (N2) exceeds a predetermined speed and generate an overspeed signal when the detected speed of the high-pressure turbine exceeds the predetermined speed.

The system further includes: a discrimination circuit (OR circuits 180*a*, 180*b*, AND circuits 182*a*, 182*b*, output circuits 184*a*, 184*b*) discriminating that the engine is overspeeding when at least two of the first to fourth CPUs (116, 118, 126, 128) generate the overspeed signal.

In the system, the discrimination circuit includes: a first OR circuit (180*a*) connected to the first CPU (116) in the first control channel (Ch-A) and the third and fourth CPUs (126, 128) in the second control channel (Ch-B), and generating an H level signal when at least one of the three CPUs generates the overspeed signal; a second OR circuit (180*b*) connected to the third CPU (126) in the second control channel (Ch-B) and the first and second CPUs (116, 118) in the first control channel (Ch-A), and generating an H level signal when at least one of the three CPUs generates the overspeed signal; a first AND circuit (182a) connected to the second CPU (118) and the first OR circuit (180a), and generating an H level signal when the second CPU (118) generates the overspeed signal and the first OR circuit (180a) generates the H level signal; and a second AND circuit (182b) connected to the fourth CPU (128) and the second OR circuit (180b), and generating an H level signal when the fourth CPU (128) generates the overspeed signal and the second OR circuit (180b) generates the H level signal; and discriminates that the engine is overspeeding when at least one of the first and second AND circuits (182a, 182b) generates the H level signal.

In the system, at least one of sensors (T1 sensor 68, P1 sensor 70, P0 sensor 72), except for the speed sensor (62, 64) and the throttle lever angle sensor (84), is constituted as a single-system comprising at least one unit whose output is inputted to only one of the first and second control channels (Ch-A, Ch-B).

In the system, at least one of the sensors (68, 70, 72) comprises one from among a sensor producing an output indicative of a condition of atmosphere that can be sent from an onboard-computer (Air Data Computer 92).

Japanese Patent Application No. 2005-143225 filed on May 16, 2005, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A system for controlling operation of a gas turbine aeroengine having a turbine, comprising:

a speed sensor for producing an output indicative of a speed of the turbine;

a throttle lever angle sensor for producing an output indicative of an angle of a throttle lever, operated by a pilot, that represents a pilot-desired output of the engine;

a first control channel having at least a first CPU and a second CPU each inputting the outputs of the speed sensor and the throttle lever angle sensor, at least one of the first CPU and the second CPU acting as a first fuel supply command value calculator to calculate a fuel supply command value to be supplied to the engine such that the speed of the turbine becomes equal to a predetermined speed and to generate a first command output indicative of the fuel supply command value, the first CPU monitoring operation of the second CPU by directly receiving signals output from the second CPU, while the second CPU monitoring operation of the first CPU by directly receiving signals output from the first CPU;

a second control channel having at least a third CPU and a fourth CPU each inputting the outputs of the speed sensor and the throttle lever angle sensor, at least one of the third CPU and the fourth CPU acting as a second fuel supply command value calculator to calculate the fuel supply command value to be supplied to the engine such that the speed of the turbine becomes equal to the predetermined speed and to generate a second command output indicative of the fuel supply command value, the third CPU monitoring operation of the fourth CPU, while the fourth CPU monitoring operation of the third CPU;

a fuel control unit inputting at least the first command output of the first fuel supply command value calculator and supplying fuel to the engine based on the first command output of the first fuel supply command value calculator; and a switch for switching the output to be inputted in the fuel control unit from the first command output to the second command output, when at least one of the first CPU and the second CPU of the first control channel is monitored to be not operating normally.

2. The system according to claim 1, wherein the first to the fourth CPUs monitor whether the detected speed of the turbine exceeds the predetermined speed and generate an overspeed signal when the detected speed of the turbine exceeds the predetermined speed.

3. The system according to claim 2, further including:

a discrimination circuit discriminating that the engine is overspeeding when at least two of the first to the fourth CPUs generate the overspeed signal.

4. The system according to claim 3, wherein the discrimination circuit includes:

a first OR circuit connected to the first CPU in the first control channel and the third and fourth CPUs in the second control channel, and generating an H level signal when at least one of the three CPUs generates the overspeed signal;

a second OR circuit connected to the third CPU in the second control channel and the first and second CPUs in the first control channel, and generating an H level signal when at least one of the three CPUs generates the overspeed signal;

a first AND circuit connected to the second CPU and the first OR circuit, and generating an H level signal when the second CPU generates the overspeed signal and the first OR circuit generates the H level signal; and a second AND circuit connected to the fourth CPU and the second OR circuit, and generating an H level signal when the fourth CPU generates the overspeed signal and the second OR circuit generates the H level signal;

and discriminates that the engine is overspeeding when at least one of the first and second AND circuits generates the H level signal.

5. The system according to claim 1, wherein at least one of sensors, except for the speed sensor and the throttle lever angle sensor, is constituted as a single-system comprising at least one unit whose output is inputted to only one of the first and second control channels.

6. The system according to claim 5, wherein the at least one of the sensors comprises one from among a sensor producing an output indicative of a condition of atmosphere that can be sent from an onboard-computer.

7. A system for controlling operation of a gas turbine aeroengine having a low-pressure turbine and a high-pressure turbine, comprising:

a speed sensor for producing an output indicative of a speed of the low-pressure turbine;

a throttle lever angle sensor for producing an output indicative of an angle of a throttle lever, operated by a pilot, that represents a pilot-desired output of the engine;

a first control channel having at least a first CPU and a second CPU each inputting the outputs of the speed sensor and the throttle lever angle sensor, at least one of the first CPU and the second CPU acting as a first fuel supply command value calculator to calculate a fuel supply command value to be supplied to the engine such that the speed of the low-pressure turbine becomes equal to a predetermined speed and to generate a first command output indicative of the fuel supply command value, the first CPU monitoring operation of the second CPU by directly receiving signals output from the second CPU, while the second CPU monitoring operation of the first CPU by directly receiving signals output from the first CPU;

a second control channel having at least a third CPU and a fourth CPU each inputting the outputs of the speed sensor and the throttle lever angle sensor, at least one of the third CPU and the fourth CPU acting as a second fuel supply command value calculator to calculate the fuel supply command value to be supplied to the engine such that the speed of the low-pressure turbine becomes equal to the predetermined speed and to generate a second command output indicative of the fuel supply command value, the third CPU monitoring operation of the fourth CPU by directly receiving signals output from the fourth CPU, while the fourth CPU monitoring operation of the third CPU by directly receiving signals output from the third CPU;

a fuel control unit inputting at least the first command output of the first fuel supply command value calculator and supplying fuel to the engine based on the first command output of the first fuel supply command value calculator; and a switch for switching the output to be inputted in the fuel control unit from the first command output to the second command output, when at least one of the first CPU and the second CPU of the first control channel is monitored to be not operating normally.

8. The system according to claim 7, further including:

a second speed sensor for producing an output indicative of a speed of the high-pressure turbine;

and the first to the fourth CPUs monitor whether the detected speed of the high-pressure turbine exceeds a predetermined speed and generate an overspeed signal when the detected speed of the high-pressure turbine exceeds the predetermined speed.

9. The system according to claim 8, further including:

a discrimination circuit discriminating that the engine is overspeeding when at least two of the first to the fourth CPUs generate the overspeed signal.

10. The system according to claim 9, wherein the discrimination circuit includes:

a first OR circuit connected to the first CPU in the first control channel and the third and fourth CPUs in the second control channels, and generating an H level signal when at least one of the three CPUs generates the overspeed signal;

a second OR circuit connected to the third CPU in the second control channel and the first and second CPUs in the first control channel, and generating an H level signal when at least one of the three CPUs generates the overspeed signal;

a first AND circuit connected to the second CPU and the first OR circuit, and generating an H level signal when the second CPU generates the overspeed signal and the first OR circuit generates the H level signal; and a second AND circuit connected to the fourth CPU and the second OR circuit, and generating an H level signal when the fourth CPU generates the overspeed signal and the second OR circuit generates the H level signal;

and discriminates that the engine is overspeeding when at least one of the first and second AND circuits generates the H level signal.

11. The system according to claim 7, wherein at least one of sensors, except for the speed sensor and the throttle lever angle sensor, is constituted as a single-system comprising at least one unit whose output is inputted to only one of the first and second control channels.

12. The system according to claim 11, wherein the at least one of the sensors comprises one from among a sensor producing an output indicative of a condition of atmosphere that can be sent from an onboard-computer.

* * * * *

UNITED STATES PATENT AND TRADEMARK OFFICE
CERTIFICATE OF CORRECTION

| | |
|---|---|
| PATENT NO. | : 7,840,336 B2 |
| APPLICATION NO. | : 11/431560 |
| DATED | : November 23, 2010 |
| INVENTOR(S) | : Hironori Muramatsu et al. |

It is certified that error appears in the above-identified patent and that said Letters Patent is hereby corrected as shown below:

Column 13:

Line 63 (claim 1), after "the fourth CPU" please add --by directly receiving signals output from the fourth CPU--

Lines 64-65 (claim 1), after "the third CPU" please add --by directly receiving signals output from the third CPU--

Signed and Sealed this
First Day of March, 2011

David J. Kappos
*Director of the United States Patent and Trademark Office*